(12) United States Patent
Park (10) Patent No.: US 6,276,764 B1
(45) Date of Patent: Aug. 21, 2001

(54) SOLENOID VALVE FOR ANTI-LOCK BRAKE SYSTEM

(75) Inventor: Kyung-Ill Park, Pyungtak (KR)

(73) Assignee: Mando Machinery Corporation, Gunpo (KR)

( * ) Notice: Subject to any disclaimer, the term of this patent is extended or adjusted under 35 U.S.C. 154(b) by 0 days.

(21) Appl. No.: 09/440,328

(22) Filed: Nov. 15, 1999

(30) Foreign Application Priority Data

Nov. 17, 1998 (KR) .................................... 98-22396
Jan. 19, 1999 (KR) .................................... 99-00579

(51) Int. Cl.$^7$ ...................................... B60T 8/36
(52) U.S. Cl. ................... 303/119.2; 303/117.1; 303/113.1; 303/900; 303/901
(58) Field of Search ............... 303/117.1, 119.2, 303/119.3, 113.1, 116.1, 900, 901, 15; 251/129.01, 129.22, 117, 127; 137/596.17, 614.19, 614.21, 625.65, 627.5, 509; 335/278, 220

(56) References Cited

U.S. PATENT DOCUMENTS

| | | | |
|---|---|---|---|
| 5,203,617 | * | 4/1993 | Wilde . |
| 5,388,899 | * | 2/1995 | Volz et al. . |
| 5,496,101 | * | 3/1996 | Kurokawa et al. . |
| 5,647,644 | | 7/1997 | Volz et al. . |
| 5,673,979 | * | 10/1997 | Kuromitsu et al. . |
| 5,683,150 | * | 11/1997 | Burgdorf et al. ................. 303/116.1 |
| 5,803,556 | * | 9/1998 | Weis et al. ........................ 303/119.2 |
| 5,887,956 | * | 3/1999 | Rausch .............................. 303/119.2 |
| 5,967,627 | * | 10/1999 | Hosoya et al. . |
| 5,971,501 | * | 10/1999 | Hosoya . |
| 5,975,654 | * | 11/1999 | Zaviska et al. . |
| 6,082,833 | * | 7/2000 | Hosoya . |

* cited by examiner

Primary Examiner—Douglas C. Butler
(74) Attorney, Agent, or Firm—Ladas & Parry (57) ABSTRACT

A solenoid valve for an anti-lock brake system is disclosed in which two orifices and oil passages are formed utilizing a valve seat and a piston. The solenoid valve includes a magnetic core (130) mounted in a bore (101) formed on a modulator (100), a plunger (140) movably mounted in the magnetic core (130), a valve seat (150) disposed below the magnetic core (130) in the bore (101), and a piston (200) movably mounted at the periphery of the valve seat (150). The valve seat (150) has an invariable orifice (320) formed at the inner middle portion of the valve seat, an inlet and outlet passages (300) and (310) formed below and above the invariable orifice (320), respectively. The piston (200) has a variable orifice (340) formed passing through one side of the upper portion of the piston. A lip seal (400) is provided between the outer periphery of the piston (200). The lower end of the valve seat (150) is fixed to the bottom surface of the bore (101) and the upper end of the valve seat (150) is spaced a given distance away from the lower end of the magnetic core (130) to form an oil outlet therebetween.

16 Claims, 9 Drawing Sheets

SOLENOID VALVE FOR ANTI-LOCK BRAKE SYSTEM

BACKGROUND OF THE INVENTION

1. Field of the Invention

This invention relates to an anti-lock brake system, and more particularly, to a solenoid valve for an anti-lock brake system that can enhance a braking performance by variably controlling an amount of hydraulic oil to be supplied during a slip control.

2. Description of Related Art

Generally, a brake system comprises a wheel cylinder mounted on an automotive wheel to generate braking force using hydraulic pressure, a booster/master cylinder assembly for generating hydraulic pressure and applying the same to the wheel cylinder, and a modulator for controlling the hydraulic pressure to be supplied according to a running condition of a vehicle in accordance with signals transmitted from an electronic control unit.

The modulator is equipped with normal-open and normal-close solenoid valves for controlling the supply of braking pressure. The normal-open solenoid valve is designed to, in a normal brake mode, maintain an opened state to supply hydraulic pressure to the master cylinder without pressure reduction, and in a slip control mode, control an amount of the hydraulic oil to control the braking pressure.

The normal-open solenoid valve controls an amount of the hydraulic oil by a simple On/Off operation of a plunger. Accordingly, the flow rate of the hydraulic oil which can pass through the valve at the slip control mode is the same as at the normal brake mode.

Therefore, in such a conventional normal-open solenoid valve, an amount of the hydraulic pressure to be supplied cannot be precisely controlled, making it difficult to accurately perform a slip control. Furthermore, a water hammering phenomenon occurs by pulsations of fluid due to the plunger's movement to open and close positions, thereby generating noises and deteriorating the durability of parts.

To solve the above described problems, a normal-open solenoid valve which is designed to reduce an amount of the hydraulic oil to be supplied to the wheel cylinder in proportion to a slip rate, while alleviating pulsations of the fluid during a slip control, has been developed.

Figure 1:
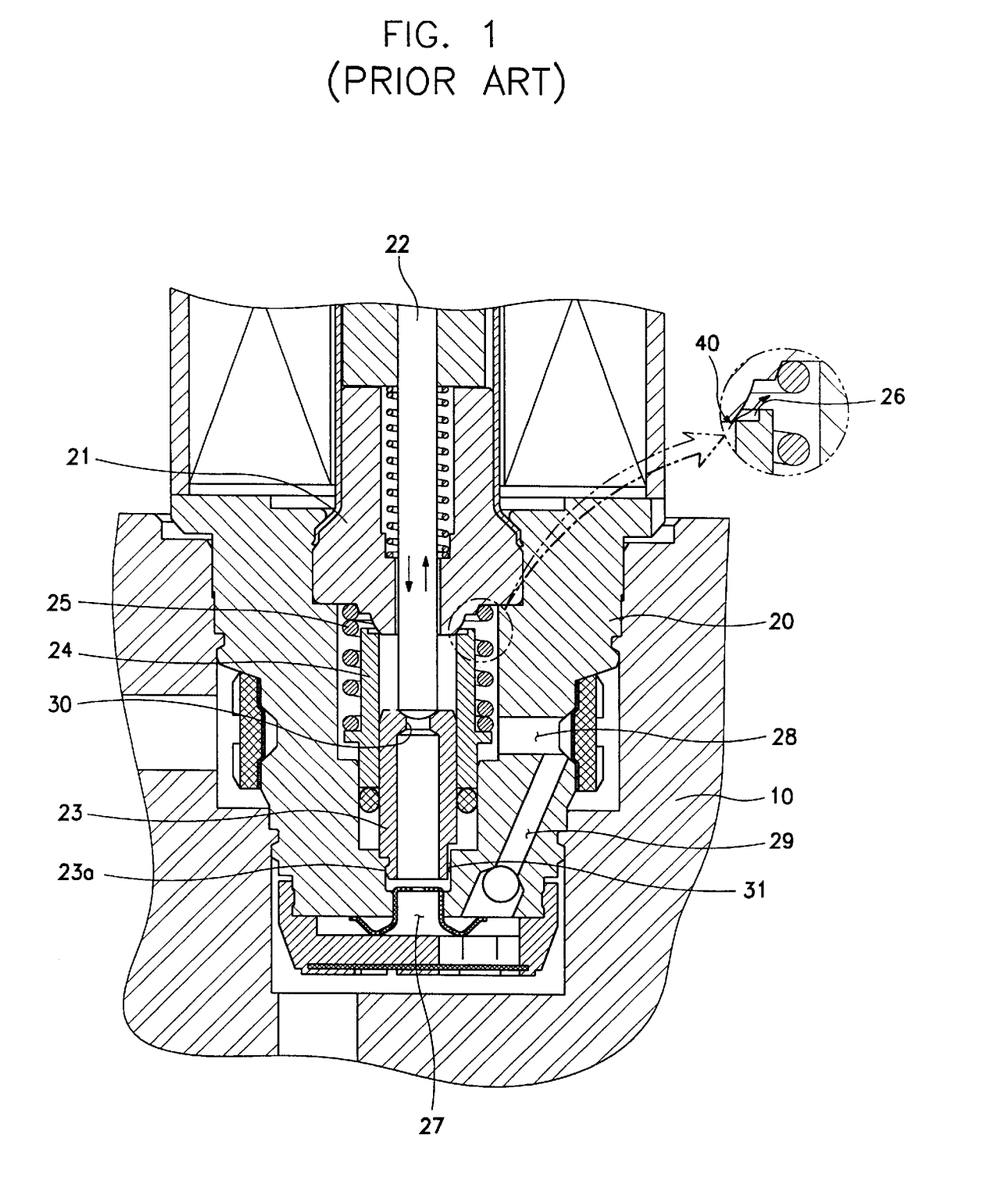
FIG. 1 is a longitudinal sectional view of a solenoid valve for a conventional anti-lock brake system.

As shown in FIG. 1, an example of such a normal-open solenoid valve is disclosed in the U.S. Pat. No. 5,647,644, which comprises a valve seat 23, a magnetic core 21, a plunger 22, and a piston 24, all of which are installed in a valve housing 20. The valve seat 23 is forcedly fitted in a lower portion of the valve housing 20 and provided with a longitudinal through hole. The plunger 22 is mounted passing through the magnetic core 21 such that a lower end thereof is disposed in the vicinity of the top of the valve seat 23. The piston 24 is disposed around the valve seat 23 and biased against the magnetic core 21 by a spring 25.

The normal-open solenoid valve is provided with two orifices, one of which is an invariable orifice formed on an upper end of the valve seat 23 and the other of which is a variable orifice 40 that is defined by a slot 26 formed on the top of the piston 24 when the piston 24 contacts the magnetic core 21 during a slip control.

In addition, a hydraulic channel branch 31 is defined between one side wall of the valve seat 23 and the valve housing 20 so that hydraulic pressure supplied through an inlet 27 can be applied to the piston 24 through the hydraulic channel branch 31, thereby displacing the piston 24 upward while overcoming the biasing force of the spring 25. A stepped portion 23a is formed on another lower side of the valve seat 23 so as to forcedly fit the valve seat 23 into the valve housing 20.

In the normal brake mode, the plunger 22 is urged upward while the piston 24 is biased downward by the spring 25. Therefore, hydraulic oil is supplied through the inlet 27, then directed to an outlet 28 through the invariable orifice 30.

In the slip control mode, the plunger 22 is displaced downward to close the invariable orifice 30. As a result, the hydraulic oil supplied through the inlet 27 is applied to the piston 24 through the hydraulic channel branch 31 so that the top of the piston 24 contacts the magnetic core 21 by being moved upward while overcoming the elastic force of the spring 25. After this, when the plunger 22 is moved upward, the hydraulic pressure generated by the master cylinder is directed to the wheel cylinder through the variable orifice 40 formed by the slot 26 of the piston 24 contacting the magnetic core 21.

When the braking force is released, the hydraulic oil within the wheel cylinder is returned to the master cylinder through the return passage 29 formed passing through the valve housing 20 to communicate the inlet 27 with the outlet 28. After this, the plunger 22 is moved upward so that the solenoid valve is returned to its open state.

However, in the above-described normal-open solenoid valve, since the lower portion of the valve seat is designed to have the stepped portion and the channel branch defining portion, and the channel branch defining portion should be precisely formed, it is difficult to manufacture the valve seat.

In addition, since the special valve housing for receiving the magnetic core, the valve seat, the piston and the fluid passages is required, the entire size of the solenoid valve is increased.

SUMMARY OF THE INVENTION

Therefore, this invention has been made in an effort to solve the above described problems.

It is an object of this invention to provide a solenoid valve for an anti-lock brake system, which can vary an amount of hydraulic oil to be supplied during a slip control.

It is another object of this invention to provide a solenoid valve, which is simple in the structure and easy to be manufactured by forming oil passages and two orifices using a valve seat and a piston.

To achieve the above objects, this invention provides a solenoid valve which comprises a magnetic core, a plunger, a piston and a valve seat, and is mounted on the modulator of an anti-lock brake system.

The magnetic core is mounted in a bore formed on the modulator, and has a plunger hole formed vertically passing through its interior.

The valve seat is disposed below the magnetic core in the bore, and has an invariable orifice formed at its inner middle, an inlet passage formed below the invariable orifice, and an outlet passage formed above the invariable orifice.

The plunger is movably mounted in the plunger hole and has a ball formed at its lower end for opening and closing the upper end of the invariable orifice.

The piston is movably mounted at the periphery of the valve seat, and has a variable orifice formed passing through one side of its upper portion, a first projection formed at a middle portion of its periphery, and a second projection formed at its lower end. The front end of the first projection is disposed adjacent to the inner periphery of the bore, and the second projection which has a length shorter than the first projection, is disposed near the bottom surface of the bore.

A spring is provided between the first projection and the magnetic core for urging the piston toward the direction to open the outlet passage.

A lip seal is provided between the first and second projections for preventing oil from flowing to the outlet passage through the piston.

As a first embodiment of this invention, the lower end of the valve seat is fixed to the bottom surface of the bore, and in this state the upper end of the valve seat is spaced a given distance away from the lower end of the magnetic core to form an oil outlet therebetween. In this first embodiment, a ring-shaped support member is mounted between the second projection of the piston and the bottom surface of the bore. Further, a side hole is formed at a lower portion of the valve seat and a slot is formed on the support member aligning with the side hole so that the inlet passage and the lip seal fitted to the outer periphery of the piston are communicated with each other.

As a second embodiment of this invention, the upper end of the valve seat is fixed to the lower end of the magnetic core, and outlet holes communicating with the outlet passage are formed at a upper portion of the valve seat. In the state that the valve seat is fixed to the magnetic core, a gap is formed between the lower end of the valve seat and the bottom surface of the bore. By the gap and a slot formed on a support member, which is mounted between the second projection of the piston and the bottom surface of the bore, the inlet passage and the lip seal fitted to the outer periphery of the piston are communicated with each other.

BRIEF DESCRIPTION OF THE DRAWINGS

Further objects and other advantages of this invention will become apparent from the following description in conjunction with the attached drawings, in which.

DETAILED DESCRIPTION OF THE PREFERRED EMBODIMENTS

Reference will now be made in detail to the preferred embodiments of this invention, examples of which are illustrated in the accompanying drawings.

Figure 2:
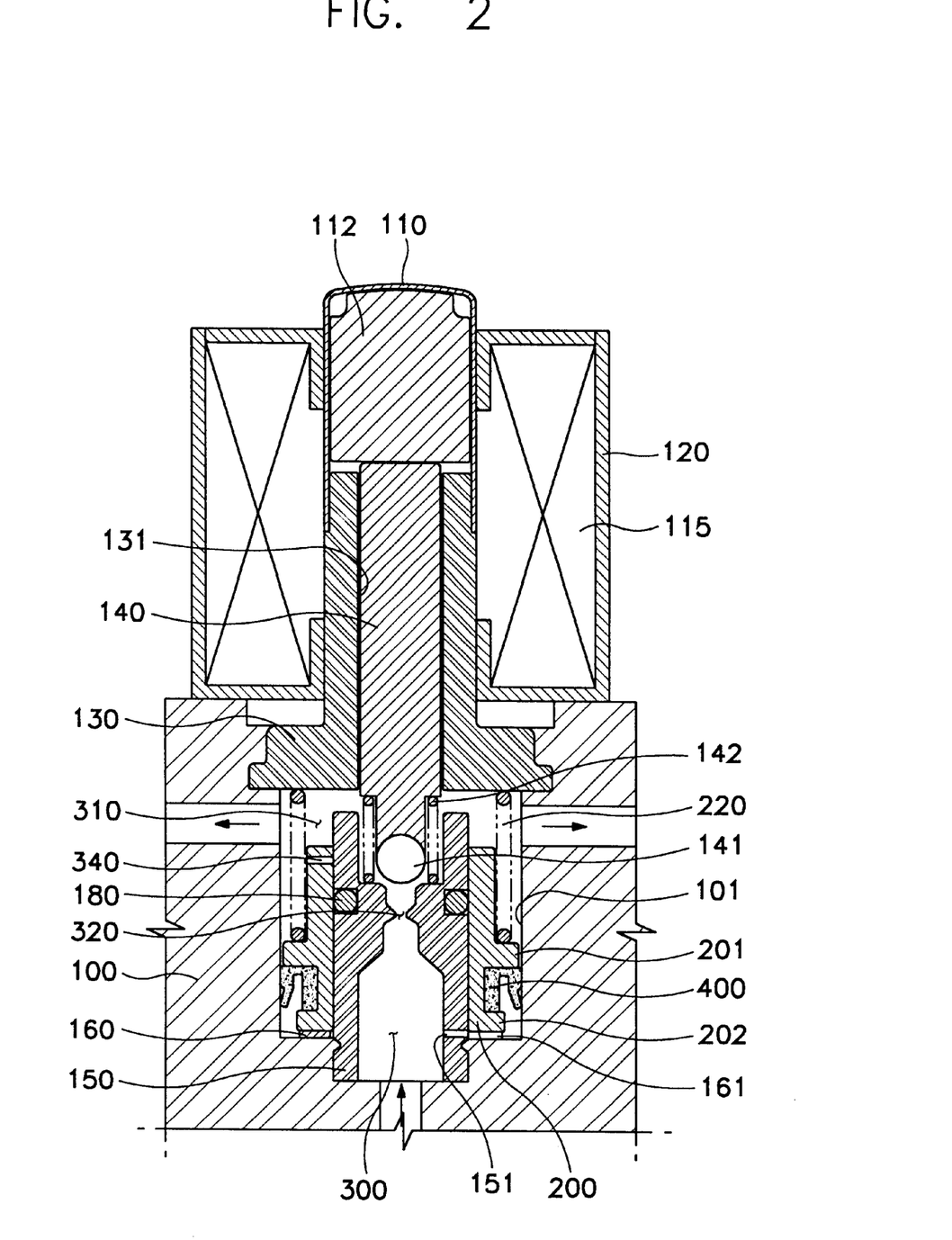
FIG. 2 is a longitudinal sectional view of a solenoid valve for an anti-lock brake system according to a first embodiment of this invention, which is in the opened state to perform a normal brake.

FIG. 2 depicts a solenoid valve kept open during the normal brake mode in accordance with a first preferred embodiment of this invention.

As shown in the figure, the normal-open solenoid valve includes a magnetic core 130, a plunger 140, a valve seat 150 and a piston 200, which is installed on a modulator 100 by fixing the valve seat 150 to the lower end of a bore 101 formed on the modulator 100 and fixing the magnetic core 130 to the upper end of the bore 101.

A sleeve 110, having an armature 112 inside, is attached to the magnetic core 130's upper portion, and a yoke 120, having a coil 115 inside, is attached to the magnetic core 130's upper circumferential surface protruding to the outside. The plunger 140 is attached to the armature 112's bottom, and the armature 112 is spaced a given distance away from the magnetic core 130 when the solenoid valve is being normally opened so as to let the plunger 140 be moved up and down.

The magnetic core 130 has a plunger hole 131 vertically formed in its inside to house the plunger 140, and the plunger 140, the top of which is attached to the armature 112, is disposed in the plunger hole 131 and the plunger 140's lower end is placed adjacent to an invariable orifice 320 which is provided in the valve seat 150. In the normal open state of the valve, the plunger 140's upper end is attached to the armature 112 while its lower end is spaced a given distance away from the upper end of the invariable orifice 320. A ball 141 is fixed to the bottom of the plunger 140 to open and close the upper end of the invariable orifice 320 during a slip control.

The valve seat 150 has a hollow cylindrical shape, and its lower end is fixed to the bottom of the bore 101 in the modulator 100 while its upper end is spaced a given distance away from the lower end of the magnetic core 130. The invariable orifice 320, having a predetermined cross-sectional area, is provided at a middle portion in the inside of the valve seat 150. At the lower area of the invariable orifice 320 is formed an inlet passage 300 for introducing hydraulic oil from a master cylinder (not illustrated), and the upper area of the invariable orifice 320 is communicated with an outlet passage for discharging the hydraulic oil to a wheel cylinder (not illustrated). A spring 142 is mounted between the plunger 140 and the valve seat 150 to urge the plunger 140 upward.

Since the passages for the flow of oil are provided by the valve seat 150 in the bore 101 of the modulator 100, the inventive solenoid valve does not have to have the conventional valve body.

The piston 200 is mounted between the outer periphery of the valve seat 150 and the inner periphery of the bore 101 in such a manner that it is movable up and down. The piston 200 has a first projection 201 which extends from a middle portion of the piston 200 toward the inner periphery of the bore 101 so as to form a minute gap between the first projection 201 and the inner periphery of the bore 101, and a second projection 202 which extends from the lower end of the piston 200 toward the periphery of the bore 101, but its length is shorter than that of the first projection 201. Further, the piston 200 has a variable orifice 340 which serves to control an amount of hydraulic oil when the outlet passage 310 is closed by the upward movement of the piston 200 during a slip control. The variable orifice 340 is comprised of a hole of a predetermined size which is formed at one side of a upper portion of the piston 200. A spring 220 is mounted between the first projection 201 of the piston 200 and the magnetic core 130 to urge the piston 200 downward.

Further, a lip seal 400 is mounted between the first projection 201 and second projection 202 of the piston 200 to prevent hydraulic oil from flowing to the outlet direction through the gap formed between the piston 200 and the bore 101, and a ring-shaped support member 160 is mounted between the second projection 202 of the piston 200 and the lower end of the bore 101. The support member 160 has a slot 161 formed at its one side, and the valve seat 150 also has a side hole 151 aligning with the slot 161. Accordingly, the inlet passage 300 and the lip seal 400 are communicated with each other through the side hole 151 and slot 161. However, the oil can flow to the inlet passage 300 from the outlet passage 310 through the gap between the piston 200 and the bore 101 by the lip seal 400, but the oil's flow to the outlet passage 310 from the inlet passage 300 is restricted by the lip seal 400. An o-ring 180 is provided at the outer periphery of the valve seat 150.

The following description relates to the operation of the normal-open solenoid valve of such a structure.

FIG. 2 depicts the solenoid valve kept in the normal open state. In this state, the plunger 140 and the armature 112 are placed on the sleeve 110's upper end, and the ball 141 attached to the plunger 140's bottom keeps the invariable orifice 320 open. The piston 200 is positioned contacting the support member 160 by the spring 220's elastic force so that the outlet passage 310 is connected to the inlet passage 300 through the invariable orifice 320, thereby keeping the valve open. Therefore, the hydraulic oil generated from the master cylinder is transmitted to the wheel cylinder through the inlet passage 300 and the outlet passage 310 to exert a brake force normally.

On the other hand, the inlet passage 300 is connected to the lip seal 400 through the side hole 151 and the slot 161, which are formed at the valve seat 150 and the support member 160, respectively, but oil flows only to the outlet passage 310 because the side hole 151 and the slot 161 are small in size relative to the invariable orifice 320 and oil's flow to the outlet direction through the gap between the piston 200 and the bore 101 is restricted by the lip seal 400.

Figure 3:
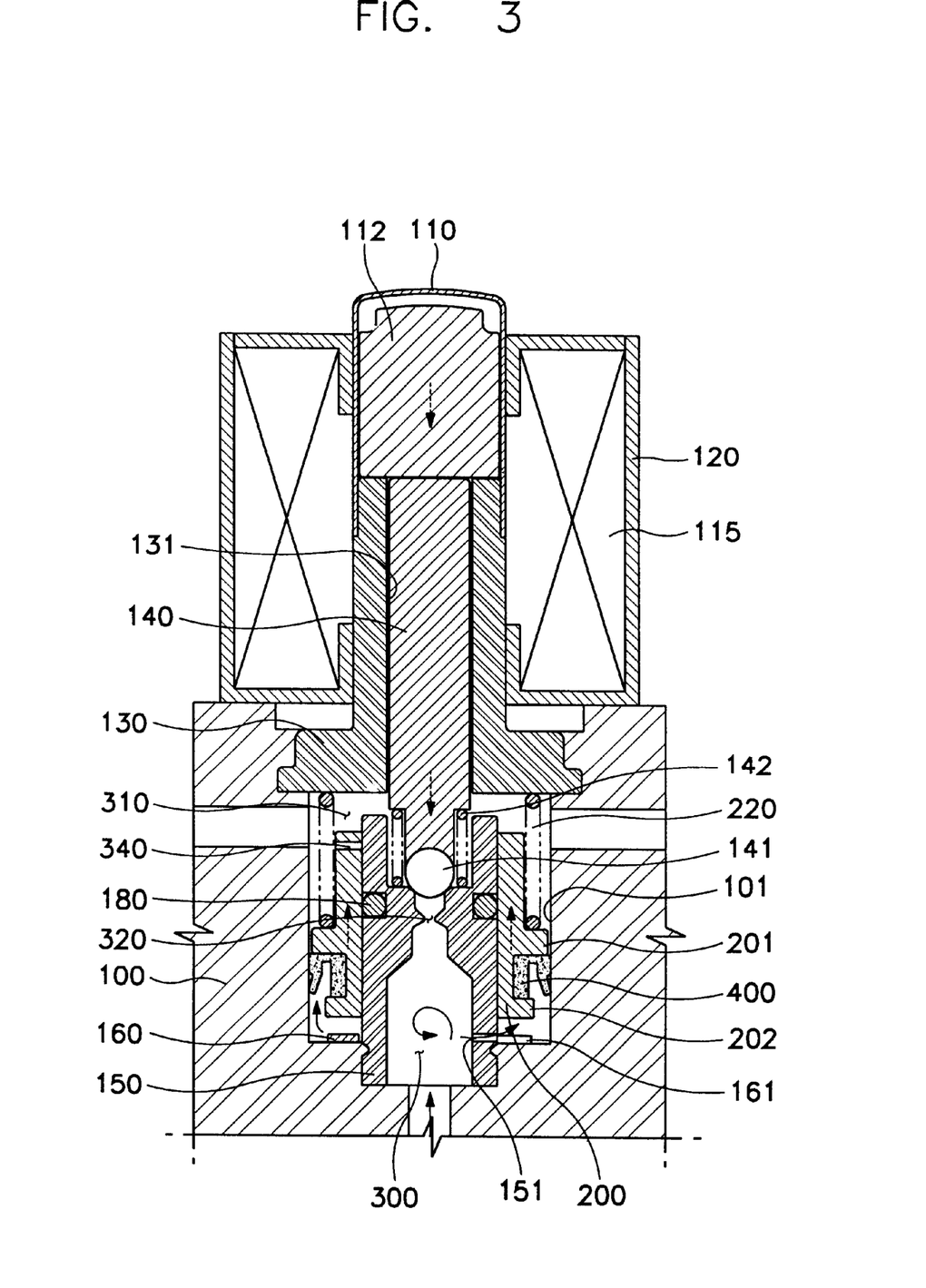
FIG. 3 is a longitudinal sectional view of the solenoid valve according to the first embodiment of this invention, which is in the process of closing the valve to perform a slip control.

If a wheel slip occurs during the normal brake mode, it is converted to the slip control mode where the brake force is reduced according to a friction force of a road surface. Thus, as shown in FIG. 3, the plunger 140 is moved down to let the ball 141 shut the upper end of the invariable orifice 320 and the inlet passage 300 is disconnected with the outlet passage 310, the hydraulic oil flows to the lip seal 400 through the side hole 151 of the valve seat 150 and the slot 161 of the support member 160. In this state, the oil's flow to the outlet passage 310 through the outer periphery of the piston 200 is restricted by the lip seal 400, and therefore the pressure difference between the inlet passage 300 and the outlet passage 310 makes the piston 200 be moved upward against the spring 220's elastic force.

Figure 4:
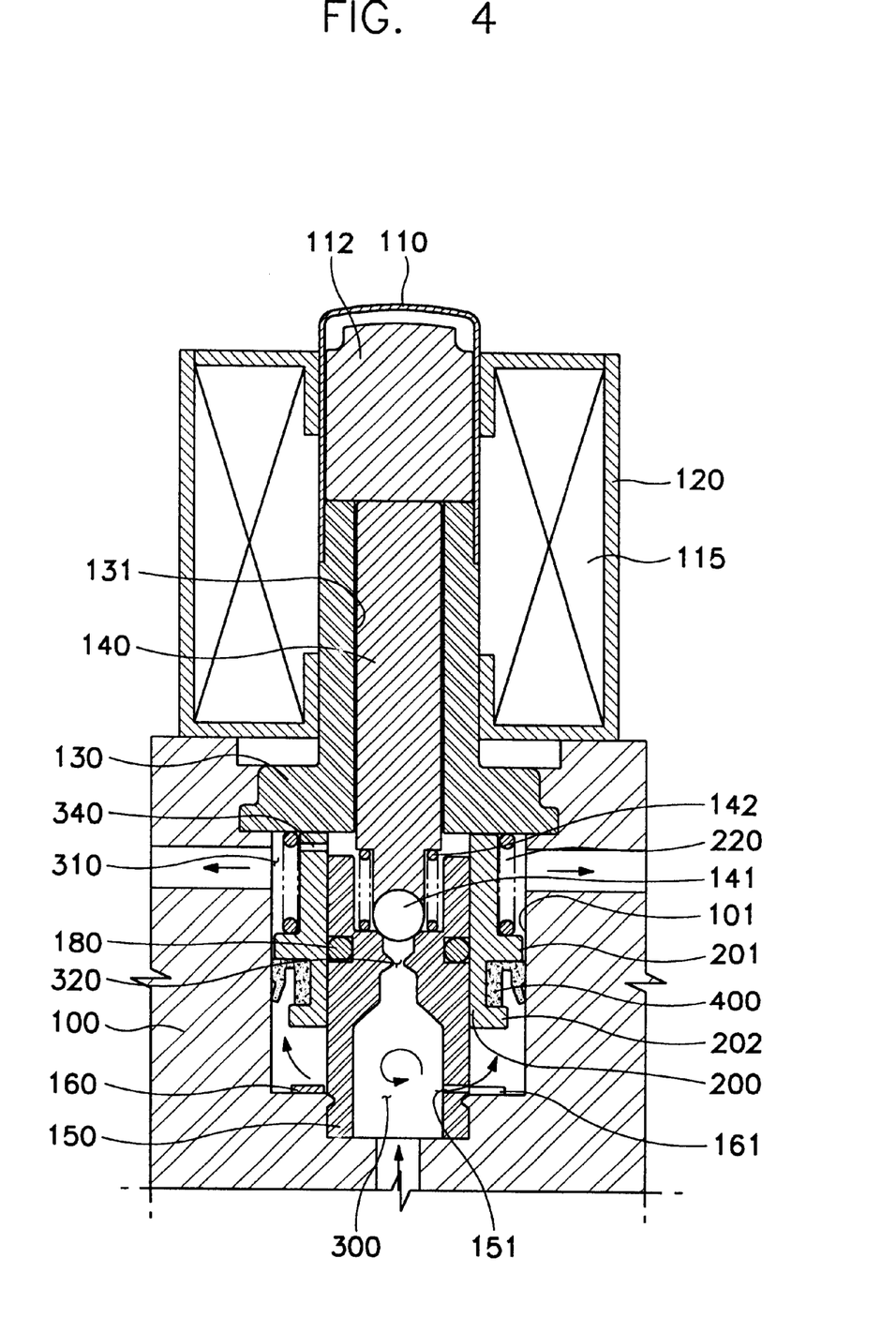
FIG. 4 is a longitudinal sectional view of the solenoid valve according to the first embodiment of this invention, which is in the closed state to perform a slip control.

FIG. 4 shows that the piston 200 is in contact with the bottom of the magnetic core 130 as the conversion to the slip control mode has been completed by the above movements. In this state, the variable orifice 340, which is formed at a upper portion of the piston 200, makes the outlet area of the invariable orifice 320 be communicated with the outlet passage 310, but the hydraulic oil from the master cylinder is not transmitted to the wheel cylinder because the invariable orifice 320 is shut by the plunger 140. As a result, a brake force is not produced.

Figure 5:
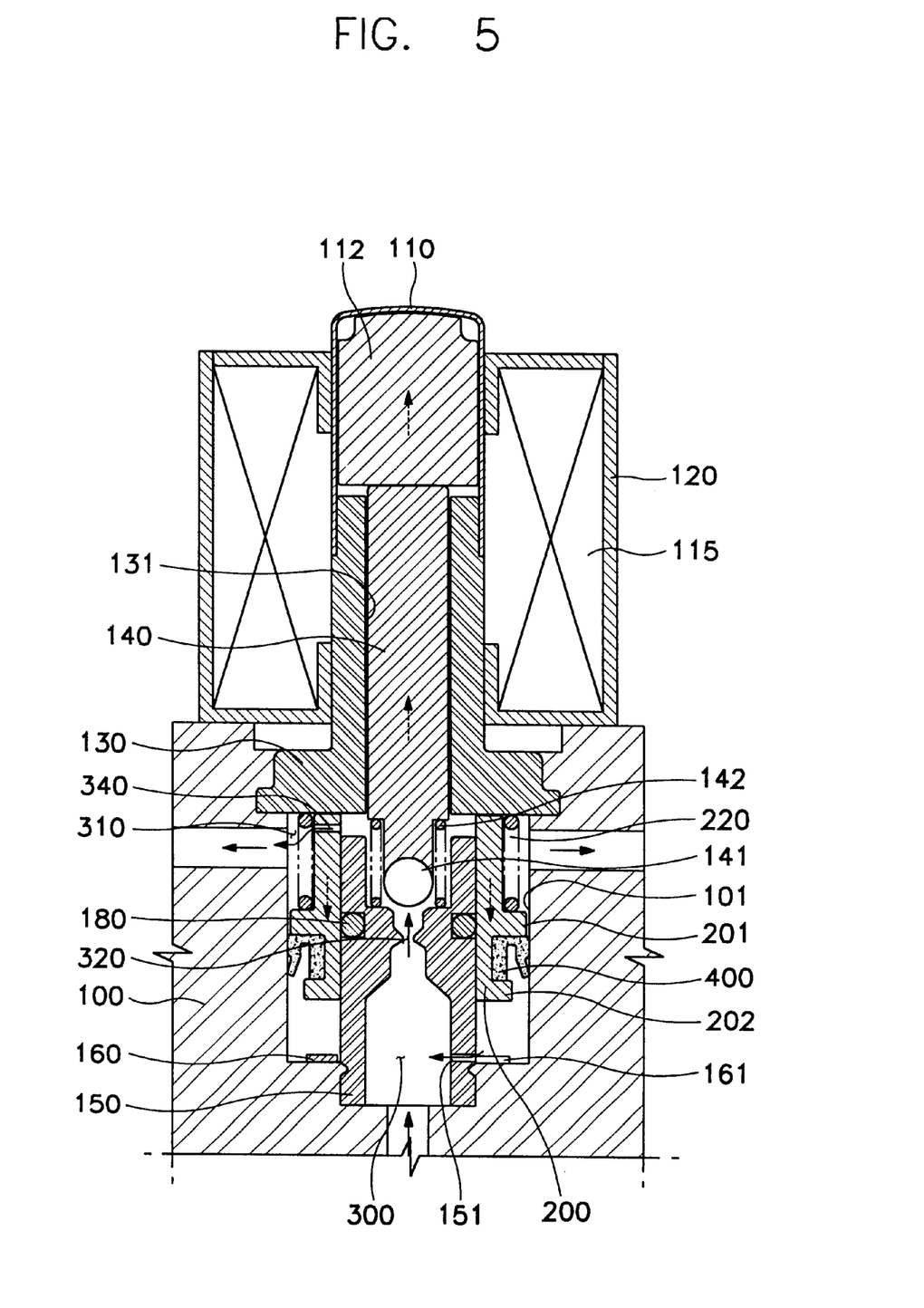
FIG. 5 is a longitudinal sectional view of the solenoid valve according to the first embodiment of this invention, which is in a partially opened state to perform a slip control.
Figure 6:
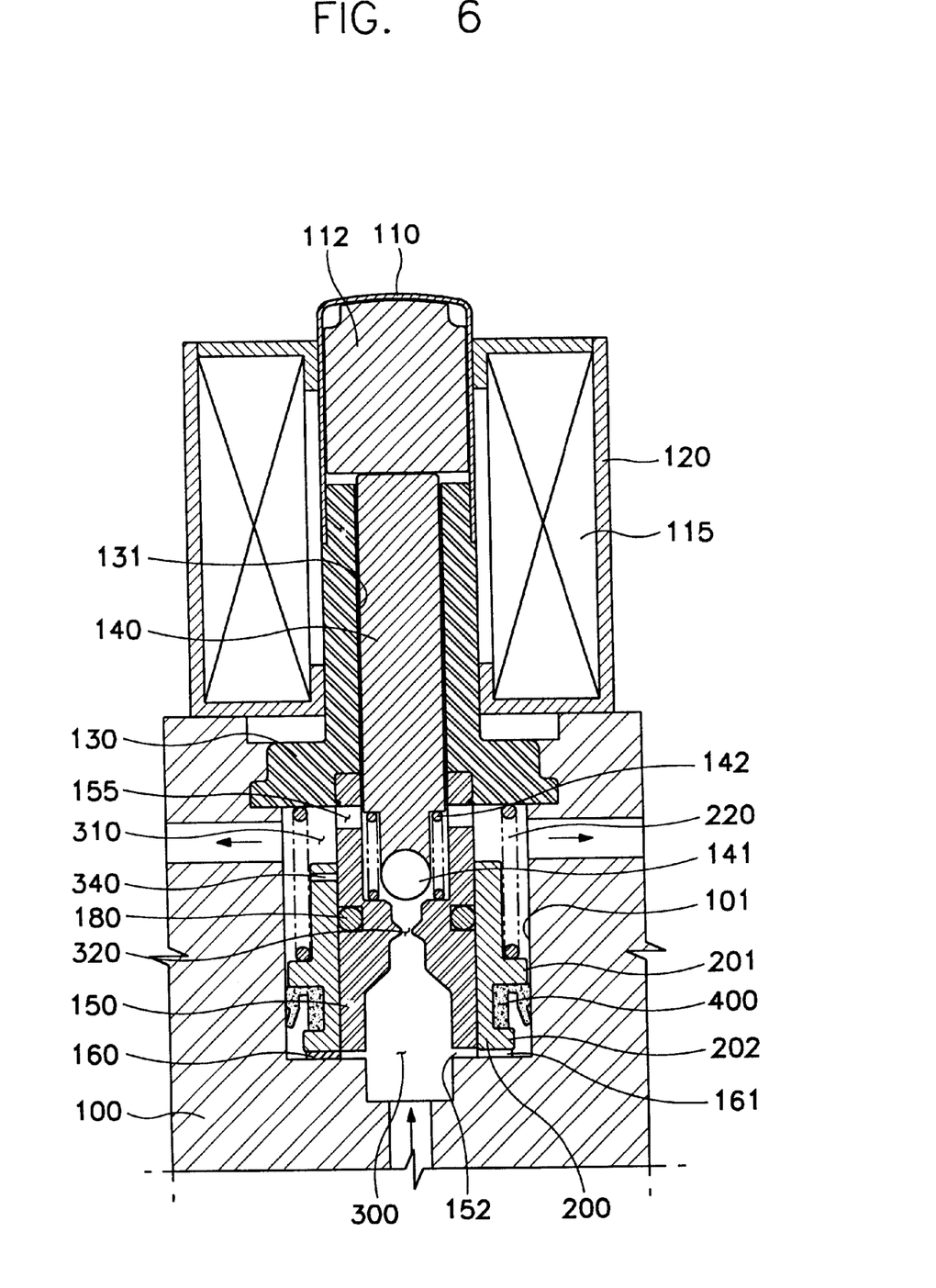
FIG. 6 is a longitudinal sectional view of a solenoid valve for an anti-lock brake system according to a second embodiment of this invention, which is in the opened state to perform a normal brake.

If an increase in the brake force is required in response to the temporary increase in the coefficient of friction on the road surface in such a slip control mode, as shown in FIG. 5, the plunger 140 is moved up while the piston 200 is stationary, thus opening the invariable orifice 320. The hydraulic oil introduced to the inlet passage 300 is transmitted to the wheel cylinder through the invariable and variable orifices 320 and 340, and the outlet passage 310.

Accordingly, the wheel slip can be controlled by the pressure reducing action of the variable orifice 340 and the opening/closing movements of the plunger 140.

In this state, if the braking pressure from the master cylinder is removed, the oil in the wheel cylinder flows to the inlet passage 300 via the gap between the modulator 100's bore 101 and the piston 200, and the slot i61 and side hole 151, thus rapidly releasing the brake force.

After this, as the plunger 140 is moved up to open the invariable orifice 320 and the piston 200 is moved down to communicate the inlet passage 300 with the outlet passage 310, the valve returns to the normal brake-state, as shown in FIG. 2.

Figure 7:
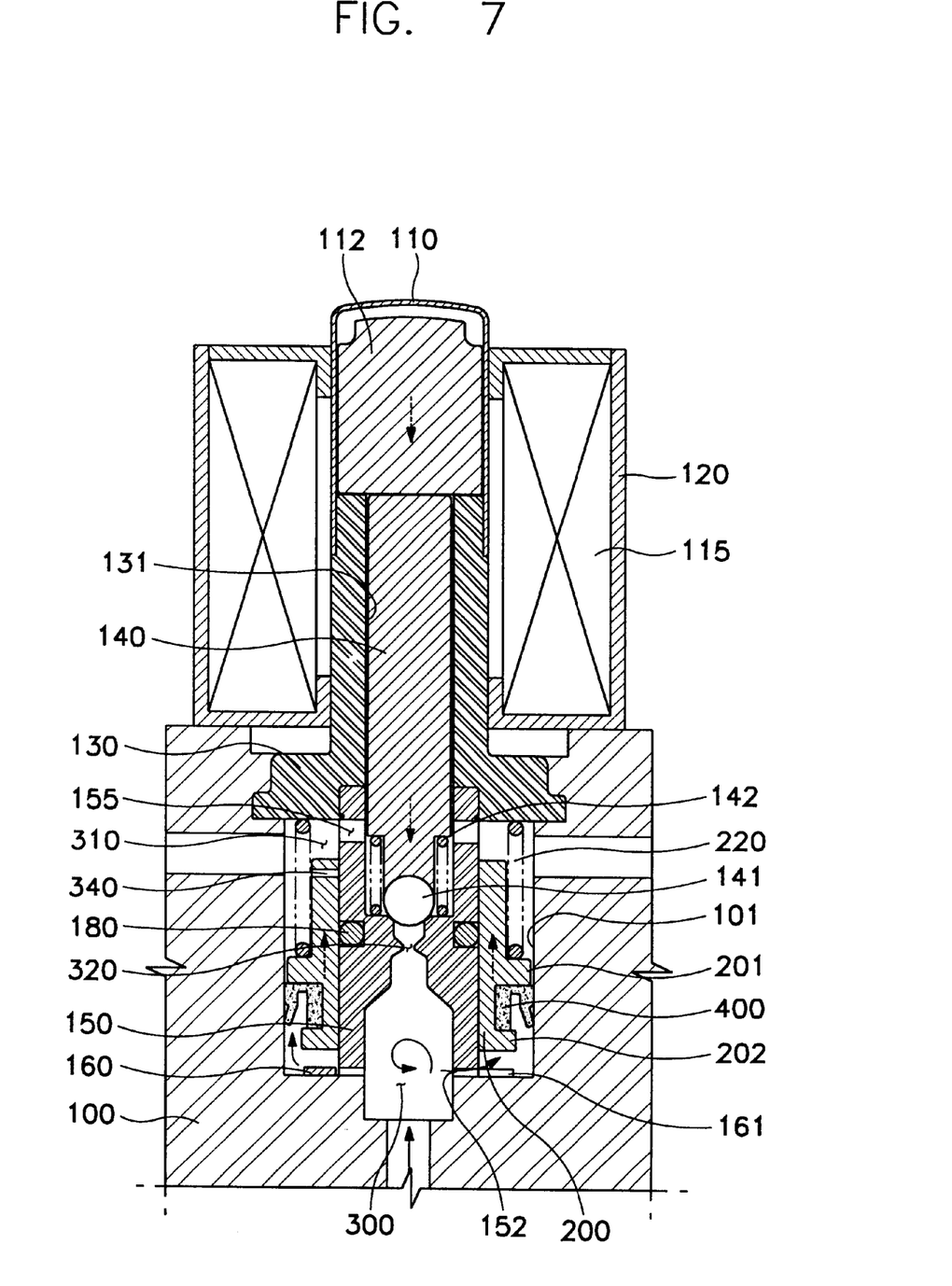
FIG. 7 is a longitudinal sectional view of the solenoid valve according to the second embodiment of this invention, which is in the process of closing the valve to perform a slip control.
Figure 8:
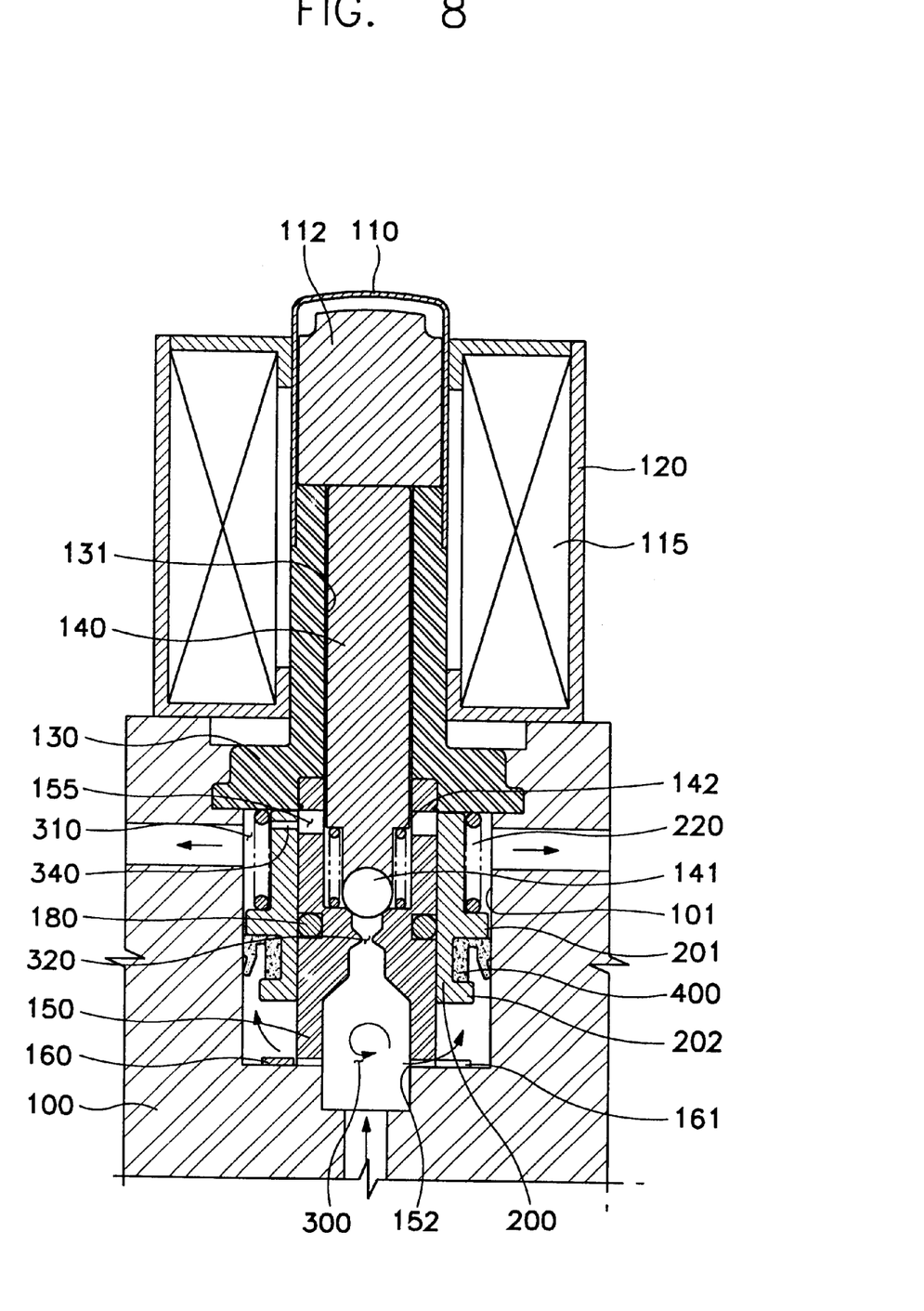
FIG. 8 is a longitudinal sectional view of the solenoid valve according to the second embodiment of this invention, which is in the closed state to perform a slip control.
Figure 9:
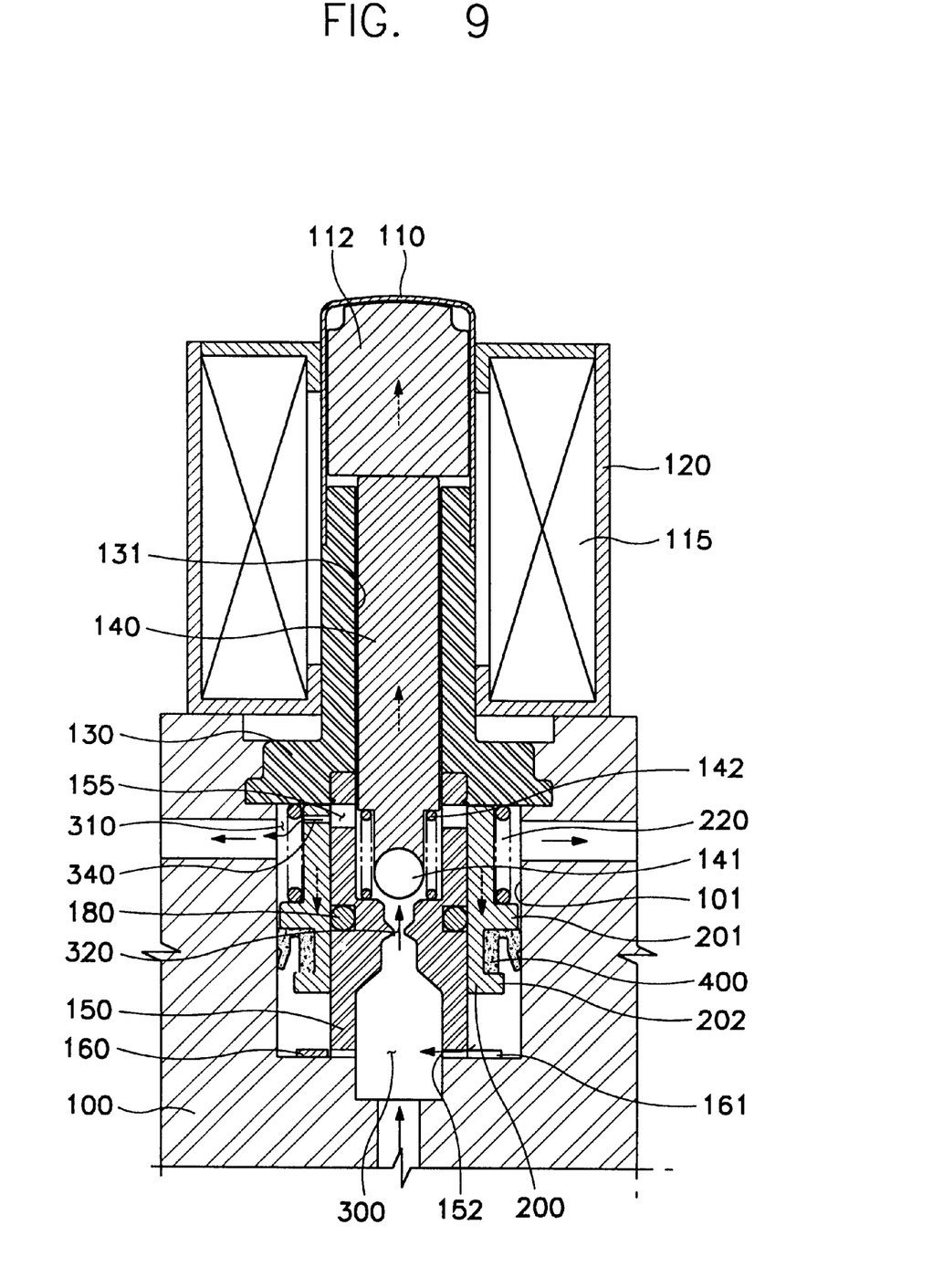
FIG. 9 is a longitudinal sectional view of the solenoid valve according to the second embodiment of this invention, which is in a partially opened stat e to perform a slip control.

FIGS. 6 to 9 show a normal-open solenoid valve in accordance with a second preferred embodiment of this invention, which are ones corresponding to FIGS. 2 to 5 showing the first embodiment aforementioned, respectively. That is, FIG. 6, which corresponds to FIG. 2 of the first embodiment, shows the solenoid valve according to the second embodiment, which is in the opened state to perform a normal brake. FIG. 7, which corresponds to FIG. 3, shows the solenoid valve according to the second embodiment, which is in the process of closing the valve to perform a slip control. FIG. 8, which corresponds to FIG. 4, shows the solenoid valve according to the second embodiment, which is in the closed state to perform a slip control. And, FIG. 9, which corresponds to FIG. 5, shows the solenoid valve according to the second embodiment, which is in a partially opened state to perform a slip control.

As depicted in the figures, in the solenoid valve according to the second embodiment, the valve seat 150 is fixed to the lower end of the magnetic core 130 and has outlet holes 155 at both sides of its upper portion to communicate with outlet passage 310. The lower end of the valve seat 150 is spaced a given distance away from the lower end of the bore 101 to form a gap 152 therebetween. The length of the gap 152 is the same as the height of the support member 160 which is mounted between the piston 200 and the lower end of the bore 101. Accordingly, the lip seal 400 is communicated with the inlet passage 300 through the gap 152 and the slot 161 formed on the support member 160.

Excepting the above structure, the solenoid valve according to the second embodiment is the same in the structure and operation as in the solenoid valve according to the first embodiment. Therefore, the structure and operation of the solenoid valve according to the second embodiment will not be further described.

As described above, since the normal-open solenoid valve of this invention includes the variable orifice that can reduce the pressure of the oil along with the invariable orifice, the brake force can be easily regulated and the wheel slip can be precisely controlled, thus enhancing the product reliability.

This dual orifice structure prevents an abrupt variation of hydraulic pressure in the oil passages so that water hammering phenomenon is not produced. Accordingly, this invention can reduce noises that may occur during operation and avoid damage to components due to the water hammering phenomenon.

In addition, in the normal-open solenoid valve of this invention the oil passages and orifices are formed utilizing the valve seat and the piston, thereby simplifying the structure and facilitating the manufacture.

What is claimed is:

1. A solenoid valve for an anti-lock brake system having a modulator comprising:

a magnetic core mounted in a bore formed on said modulator, with a plunger hole formed vertically passing through the interior of said magnetic core;

a valve seat disposed below said magnetic core in said bore, with an invariable orifice formed at the inner middle portion of said valve seat, an inlet passage formed below said invariable orifice, and an outlet passage formed above said invariable orifice, wherein the lower end of said valve seat is fixed to the bottom surface of said bore, and in this state the upper end of said valve seat is spaced a given distance away from the lower end of said magnetic core to form an oil outlet therebetween;

a plunger movably mounted in said plunger hole, with a ball formed at the lower end of said plunger for opening and closing the upper end of said invariable orifice;

a piston movably mounted at the periphery of said valve seat, with a variable orifice formed passing through one side of the upper portion of said piston, wherein said piston comprises:

a first projection formed at a middle portion of the periphery of said piston, the front end of which is disposed adjacent to the inner periphery of said bore; and a second projection formed at the lower end of said piston and disposed near the bottom of said bore, the length of said second projection being shorter than said first projection; and a lip seal provided between said first and second projections for preventing oil from flowing to said outlet passage through said piston.

2. The solenoid valve according to claim 1, wherein a spring is provided between said first projection and said magnetic core for urging said piston toward the direction to open said outlet passage.

3. The solenoid valve according to claim 1, wherein a ring-shaped support member is mounted between the second projection of said piston and the bottom surface of said bore.

4. The solenoid valve according to claim 3, wherein a side hole is formed at a lower portion of said valve seat and a slot is formed on said support member aligning with said side hole, so that said inlet passage and said lip seal fitted to the outer periphery of said piston are communicated with each other.

5. The solenoid valve according to claim 1, wherein the upper end of said valve seat is fixed to the lower end of said magnetic core, and outlet holes communicating with said outlet passage are formed at a upper portion of said valve seat.

6. The solenoid valve according to claim 5, wherein a ring-shaped support member is mounted between the second projection of said piston and the bottom surface of said bore.

7. The solenoid valve according to claim 6, wherein in the state that said valve seat is fixed to said magnetic core, a gap is formed between the lower end of said valve seat and the bottom surface of said bore, and a slot is formed on said support member, so that said inlet passage and said lip seal fitted to the outer periphery of said piston are communicated with each other.

8. A solenoid valve for an anti-lock brake system having a modulator comprising:

a magnetic core mounted in a bore formed on said modulator, with a plunger hole formed vertically passing through the interior of said magnetic core;

a valve seat disposed below said magnetic core in said bore, with an invariable orifice formed at the inner middle portion of said valve seat, an inlet passage formed below said invariable orifice, and an outlet passage formed above said invariable orifice, wherein the lower end of said valve seat is fixed to the bottom surface of said bore, and in this state the upper end of said valve seat is spaced a given distance away from the lower end of said magnetic core to form an oil outlet therebetween;

a plunger movably mounted in said plunger hole, with a ball formed at the lower end of said plunger for opening and closing the upper end of said invariable orifice; and a piston movably mounted at the periphery of said valve seat, with a variable orifice formed passing through one side of the upper portion of said piston.

9. The solenoid valve according to claim 8, wherein said piston comprises a first projection formed at a middle portion of the periphery of said piston, the front end of which is disposed adjacent to the inner periphery of said bore, and a second projection formed at the lower end of said piston and disposed near the bottom of said bore, the length of said second projection being shorter than said first projection.

10. The solenoid valve according to claim 9, wherein a spring is provided between said first projection and said magnetic core for urging said piston toward the direction to open said outlet passage.

11. The solenoid valve according to claim 9, wherein a lip seal is provided between said first and second projections for preventing oil from flowing to said outlet passage through said piston.

12. The solenoid valve according to claim 8, wherein a ring-shaped support member is mounted between the second projection of said piston and the bottom surface of said bore.

13. The solenoid valve according to claim 12, wherein a side hole is formed at a lower portion of said valve seat and a slot is formed on said support member aligning with said side hole, so that said inlet passage and said lip seal fitted to the outer periphery of said piston are communicated with each other.

14. The solenoid valve according to claim 8, wherein the upper end of said valve seat is fixed to the lower end of said magnetic core, and outlet holes communicating with said outlet passage are formed at a upper portion of said valve seat.

15. The solenoid valve according to claim 14, wherein a ring-shaped support member is mounted between the second projection of said piston and the bottom surface of said bore.

16. The solenoid valve according to claim 15, wherein in the state that said valve seat is fixed to said magnetic core, a gap is formed between the lower end of said valve seat and the bottom surface of said bore, and a slot is formed on said support member, so that said inlet passage and said lip seal fitted to the outer periphery of said piston are communicated with each other.

* * * * *